(12) United States Patent
Borkiewicz et al.

(10) Patent No.: US 9,380,791 B2
(45) Date of Patent: Jul. 5, 2016

(54) APPARATUS AND METHOD FOR MACERATING MEAT-TYPE PRODUCTS

(75) Inventors: Zbigniew Stanislaw Borkiewicz, Sun Prairie, WI (US); Thomas W. Kleckner, McFarland, WI (US); Timothy Dale Schnell, DeForest, WI (US)

(73) Assignee: Kraft Foods Group Brands LLC, Chicago, IL (US)

( * ) Notice: Subject to any disclaimer, the term of this patent is extended or adjusted under 35 U.S.C. 154(b) by 829 days.

(21) Appl. No.: 13/457,116

(22) Filed: Apr. 26, 2012

(65) Prior Publication Data

US 2012/0276827 A1 Nov. 1, 2012

Related U.S. Application Data

(60) Provisional application No. 61/479,672, filed on Apr. 27, 2011.

(51) Int. Cl.
  *A22C 9/00* (2006.01)

(52) U.S. Cl.
  CPC ............... *A22C 9/004* (2013.01); *A22C 9/008* (2013.01)

(58) Field of Classification Search
  CPC ................................ A22C 9/00; A22C 9/08
  USPC .......................................... 452/141–145, 148
  See application file for complete search history.

(56) References Cited

U.S. PATENT DOCUMENTS

| | | | |
|---|---|---|---|
| 168,602 A | 10/1875 | Billington | |
| 2,243,492 A | 5/1941 | Wilson | |
| 2,279,071 A | 4/1942 | Spang | |
| 2,564,651 A | 8/1951 | Spang | |
| 2,811,743 A * | 11/1957 | Crabtree, Jr. | 452/142 |
| 3,347,679 A * | 10/1967 | Nordin | 426/281 |
| 3,786,536 A * | 1/1974 | Deckert | 452/141 |
| 3,823,441 A * | 7/1974 | Bridge, Jr. | 452/142 |
| 4,085,482 A * | 4/1978 | Charron | 452/142 |
| 4,343,067 A | 8/1982 | Shelton | |
| 4,348,787 A | 9/1982 | Wolff | |
| 4,360,952 A * | 11/1982 | Sampson | 452/142 |
| 4,385,420 A * | 5/1983 | Shelton | 452/142 |
| 5,114,379 A * | 5/1992 | Prosenbauer | 452/142 |
| 5,145,453 A * | 9/1992 | Anderson et al. | 452/142 |
| 5,340,354 A * | 8/1994 | Anderson et al. | 452/142 |
| 6,257,132 B1 * | 7/2001 | Bifulco | 100/161 |
| 6,601,499 B1 | 8/2003 | Bifulco | |
| 7,410,414 B2 * | 8/2008 | Lagares Corominas | 452/142 |
| 7,682,227 B1 * | 3/2010 | Bifulco | 452/141 |
| 7,806,754 B2 * | 10/2010 | Stoughton | 452/141 |
| 8,764,524 B2 * | 7/2014 | Lagares Corominas | 452/142 |

FOREIGN PATENT DOCUMENTS

FR     2833464 A1    6/2003

OTHER PUBLICATIONS

English Translation of FR2833464 published Jun. 20, 2003.

* cited by examiner

*Primary Examiner* — Richard Price, Jr.
(74) *Attorney, Agent, or Firm* — Fitch, Even, Tabin & Flannery LLP

(57) ABSTRACT

An apparatus and method for macerating raw meat pieces includes two sets of rotating arbors, each having a different primary function. More particularly, the first arbor set is primarily configured to flatten and roughly tenderize the meat. The second arbor set is primarily configured to increase the surface area and tenderness of the meat without breaking the meat apart, though the second arbor set may also further reduce the thickness of the meat pieces. The second arbor set is positioned downstream of the first arbor set by a conveyor such that the meat pieces advancing through the macerator are only macerated by one of the arbor sets at any give time. Each arbor set has a pair of counter rotating shafts.

31 Claims, 9 Drawing Sheets

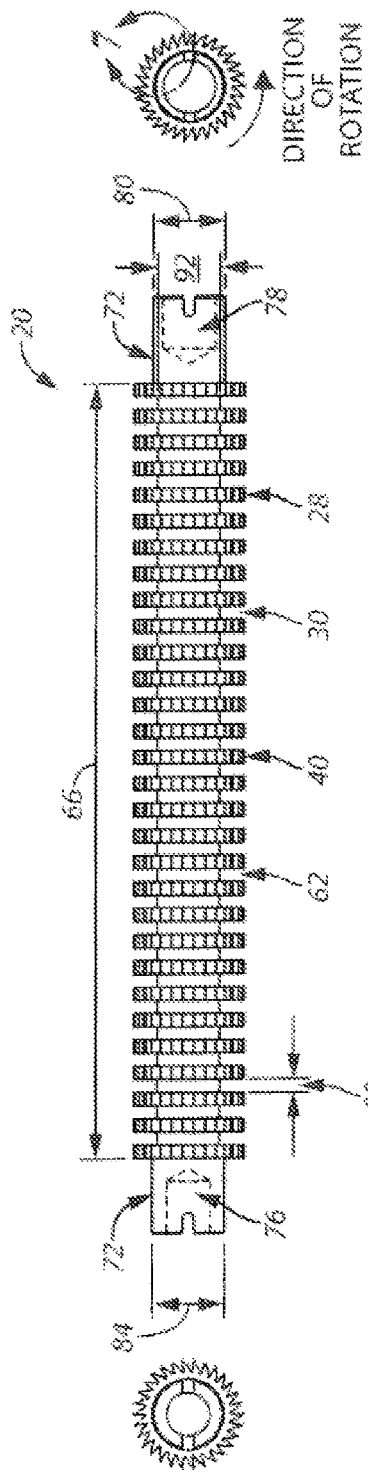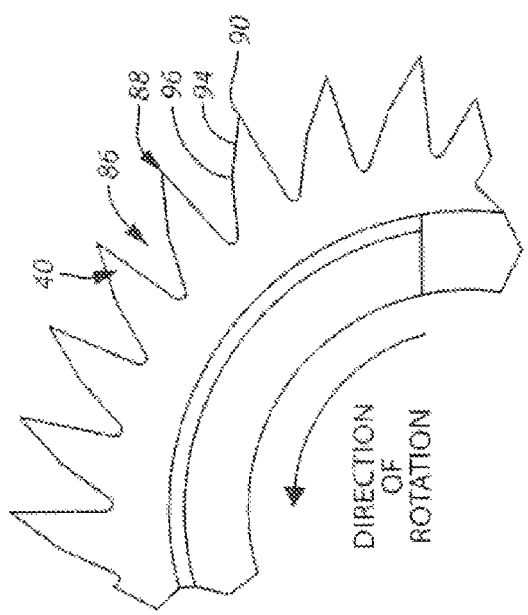
FIG. 6
FIG. 7

SINGLE WIDE ARBOR TOOTH
NOT CURVED

DOUBLE WIDE ARBOR TOOTH
NOT CURVED

SINGLE WIDE ARBOR TOOTH
CURVED

DOUBLE WIDE ARBOR TOOTH
CURVED

APPARATUS AND METHOD FOR MACERATING MEAT-TYPE PRODUCTS

CROSS-REFERENCE TO RELATED APPLICATION

This application claims the benefit of U.S. Provisional Application No. 61/479,672, filed Apr. 27, 2011, which is hereby incorporated by reference in its entirety.

TECHNICAL FIELD

This invention relates generally to meat processing, specifically to an apparatus and method for macerating meat or meat-type products prior to further processing.

BACKGROUND

Macerating raw whole muscle meat pieces prior to further processing can improve the water holding capacity and the texture of the final meat product. Further, maceration increases the surface area of whole muscle meat pieces and may increase the rate of absorption of non-meat ingredients such as salt and flavorings. To increase the surface area, macerators use implements such as rotating blades, spiked teeth, or other protrusions to produce slight cuts, ruptures, or tears, or to stretch the surface. The protrusions may open up or stretch the whole muscle meat pieces merely by protruding into the muscle without aggressively working the meat or otherwise causing significant structural degradation to the whole muscle meat. The increase in surface area is, nonetheless, a physical action that results in increased protein solubility and improves the water holding capacity by exposing more binding sites for water molecules. As used herein, the term "raw whole muscle meat" describes meat that has not undergone significant processing and includes not only whole muscles but also smaller pieces or chunks. Some pieces are about the size of a fist, for example. The term "raw whole muscle meat" does not include ground meat or other meat of which the structural integrity has been substantially compromised by mechanical action.

It is well know to flatten meat, such as through pressing or pounding operations. In addition to macerating the meat by tenderizing and increasing the surface area, such flattening operations also resize the meat to provide a relatively uniform and consistent thickness, which helps ensure proper cooking of the meat. In other operations, meat pieces may be fed between a pair of counter-rotating shafts that have projections that press into the meat as the meat passes through the space between the shafts.

While the counter-rotating shafts are suited for processing meats of a similar size, such equipment is not typically suited to process meat pieces having a wide variety of sizes and configurations. Meat pieces are often divided among their relative sizes and then processed with similarly sized meats. This processing is done after the maceration equipment is calibrated to the size of meat pieces in a batch by adjusting the counter-rotating shafts. Alternatively differently sized meat pieces are sometimes processed together, then meat pieces requiring additional maceration are run through the counter-rotating shafts again. These approaches can be time consuming, inefficient, and impractical when working with certain large batches of meat.

SUMMARY

The illustrated apparatus provides a more efficient system for macerating raw meat pieces to increase surface area and absorption of ingredients such as salts and flavorings, while avoiding excessive tearing. The illustrated apparatus includes two sets of rotating arbors, each having a different primary function. The first arbor set is primarily configured to flatten and roughly tenderize the meat. The first arbor set also may reduce the thickness of the meat pieces, crush or squeeze the meat pieces and/or create or puncture holes or openings in the meat pieces. The second arbor set is primarily configured to increase the surface area and tenderness of the meat without breaking the meat apart, though the second arbor set may also further reduce the thickness of the meat pieces. For example, the second arbor set may crush the meat muscle cells while retaining the overall appearance of the whole muscle meat. Each arbor set has a pair of counter rotating shafts and, therefore, the macerator has at least four arbor shafts. The raw meat is passed between the counter-rotating arbors at the first and second maceration stations.

The maceration apparatus has a first conveyor positioned to receive raw meat and deliver the meat to a first arbor set. The first arbor set has upper and lower rotatable arbors and is positioned upstream of the second arbor set. The first upper and lower rotatable arbors have a first distance between them. A second conveyor is positioned at the exit of the first arbor set and receives the raw meat pieces as they exit the first arbor set. The second conveyor then delivers or transports the raw meat pieces to the second arbor set. The second arbor set has upper and lower rotatable arbors that have a second distance between them. The second distance is smaller than the first distance. The distance between the first and second maceration stations is preferably long enough that the meat advancing through the apparatus is not engaged by the first and second stations simultaneously.

Each arbor is preferably an integral one-piece sleeve or shaft that has projections formed thereon. The integral sleeve may have a central cavity extending therethrough. By another approach, the integral sleeve may have central cavities that extend through portions of the arbor adjacent the ends thereof. The central cavities at the ends of the arbor may receive respective drive shafts and other mounting elements such as idler gears. In another embodiment, the arbor may include individual projection elements that can be individually mounted onto a drive shaft. Individual discs having projections and recesses thereon may be secured together to form an arbor. By one approach, the axial dimension of each individual disc is about equal to the axial dimension of one recess or projection. Alternatively, one disc may include a projection and a recess, or possibly several projections or recesses.

So configured, the illustrated apparatus provides a desired degree of maceration for whole muscle meat pieces having a wide range of dimensions without requiring the meat pieces to be divided based on size or to be processed through the macerator a second time with differently calibrated settings, and without the excessive tearing or breakdown of muscle fibers that can occur under certain circumstances, such as where large pieces are drawn through a very small gap. This apparatus, is useful where meat pieces are more varied in size, e.g., due to increases in animal muscle mass.

BRIEF DESCRIPTION OF THE DRAWINGS

FIG. 6 is a detail top view of one of the first stage arbors of FIG. 2;

FIG. 7 is a side view of a portion of FIG. 6;

Elements in the figures are illustrated for simplicity and clarity and have not necessarily been drawn to scale.

DETAILED DESCRIPTION

Figure 1:
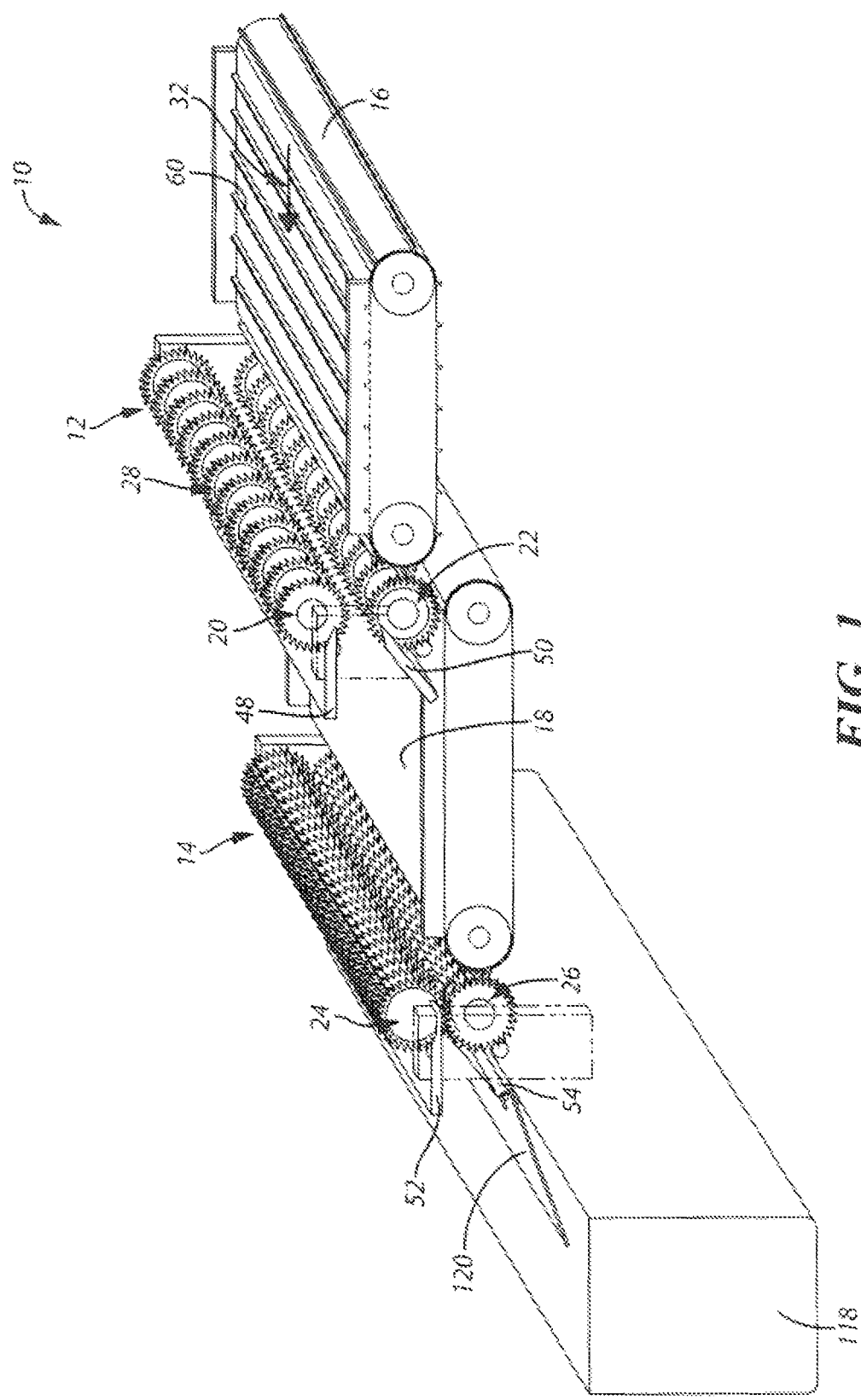
FIG. 1 is a partial schematic view of an embodiment of the invention.

Referring to FIG. 1, an illustrative maceration apparatus 10 has a first maceration station 12 and a second maceration station 14. A first conveyor 16 delivers raw whole muscle meat to the first maceration station 12. The second maceration station 14 is separated from the first maceration station 12 by a second conveyor 18. The distance between the two maceration stations is preferably greater than the lengths of the largest raw meat pieces to be macerated and, therefore, each meat piece will only be macerated by one maceration station at a time. Preventing a single meat piece from being simultaneously macerated by two macerations stations helps the meat pieces remain largely intact or whole, and prevents them from being broken apart, overly worked and otherwise damaged. The distance between the first and second arbor maceration stations may depend on the type of meat being macerated. For example, chicken and turkey whole muscle meat pieces will generally be smaller than beef whole muscle meat pieces. The second conveyor 18 may provide a distance of between 12 inches and 6 feet from the first and second maceration stations. For example, a 12 inch conveyor may be used for certain chicken and turkey meats, whereas for beef the second conveyor 18 may be, e.g., at least 1.5 feet.

Figure 4:
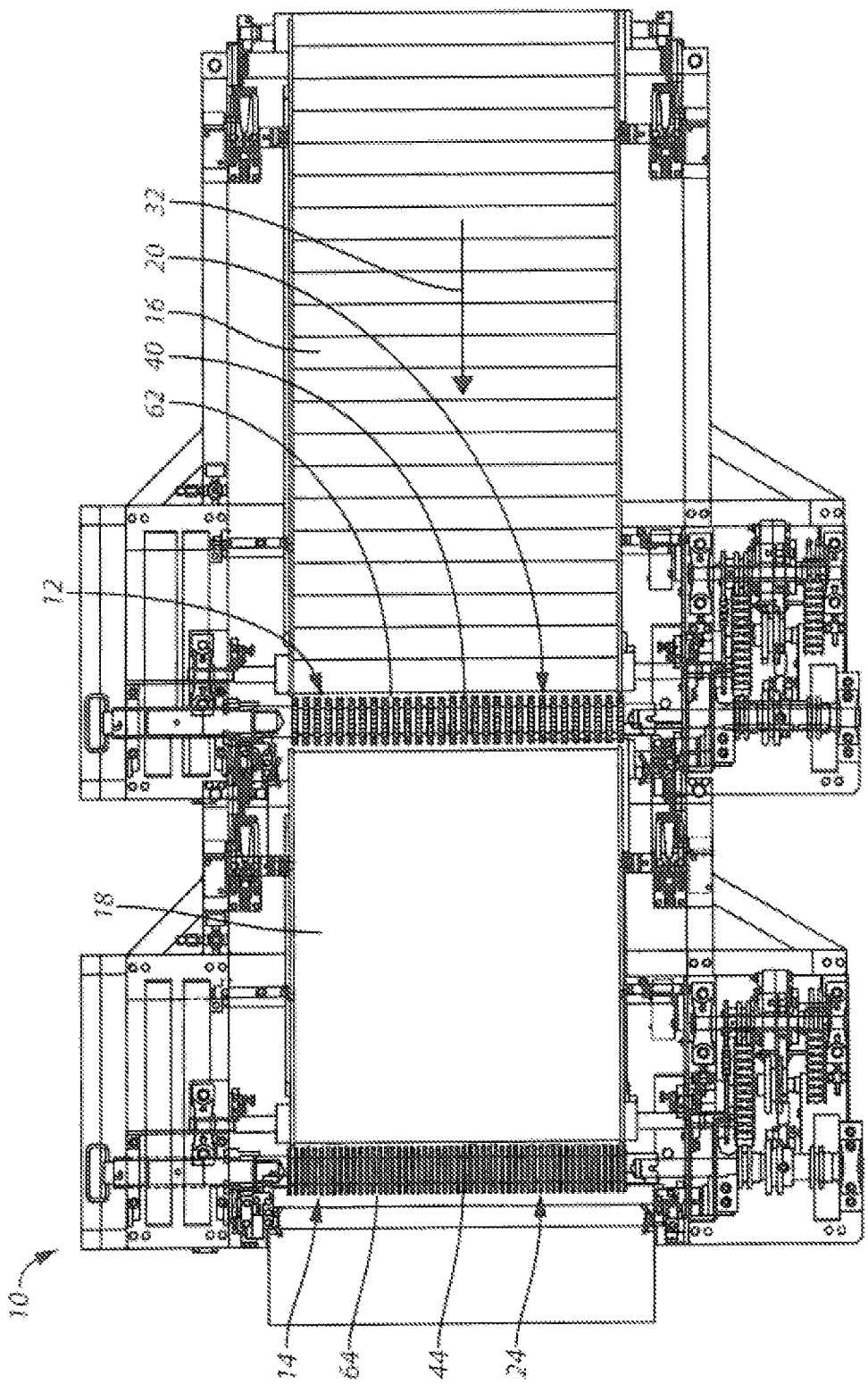
FIG. 4 is a plan view of FIG. 2.

Each of the first and second maceration stations 12, 14 has a pair of counter-rotating shafts or arbors that are generally parallel to each other. The first maceration station 12 or first arbor set has upper and lower arbors 20, 22. The second maceration station 14 or second arbor set has upper and lower arbors 24, 26. As shown in FIG. 4, each arbor is supported by a drive shaft—on one end and an idler shaft—on the other end. Each arbor has an integrated assembly of radially projecting and axially extending teeth members or projection portions 28 and narrow spacers, or recess portions 30 in alternating rows. The rows of projections 28 are positioned on the arbors in an offset arrangement such that the projections 28 of one arbor are positioned opposite the recesses 30 on the other arbor in each maceration station.

The projections 28 have an outer portion that penetrates into the raw meat pieces passing through the counter-rotating arbors in the axial plane. While the projections of the first maceration station may be identical or nearly identical to the projections of the second maceration station, it is also contemplated that the projection size and geometry may be different such that the projections of the first maceration station are larger or otherwise different than the projections of the second maceration station. For example, the projections and recesses may have a variety of widths. In one illustrative embodiment, the first maceration station 12 may have projections with a width of about 0.18 to 0.5 in. and recesses with a width of about 0.2 to 1.0 in., while the second maceration station 14 may have projections with a width of about 0.18 to 0.37 in. and recesses with a width of about 0.2 to 0.5 in.

A tote, bin, or other container 118 may be positioned at the exit of maceration apparatus 10 to receive the meat pieces exiting from the second maceration station 14. Furthermore, a slide or extension 120 may guide the meat pieces from the second maceration station 14 to the container 118. The extension 120 may also be connected to a stripper comb 54, which helps remove the meat from the projections as discussed below. In another embodiment, the extension 120 may be connected to a frame of the apparatus.

Figure 2:
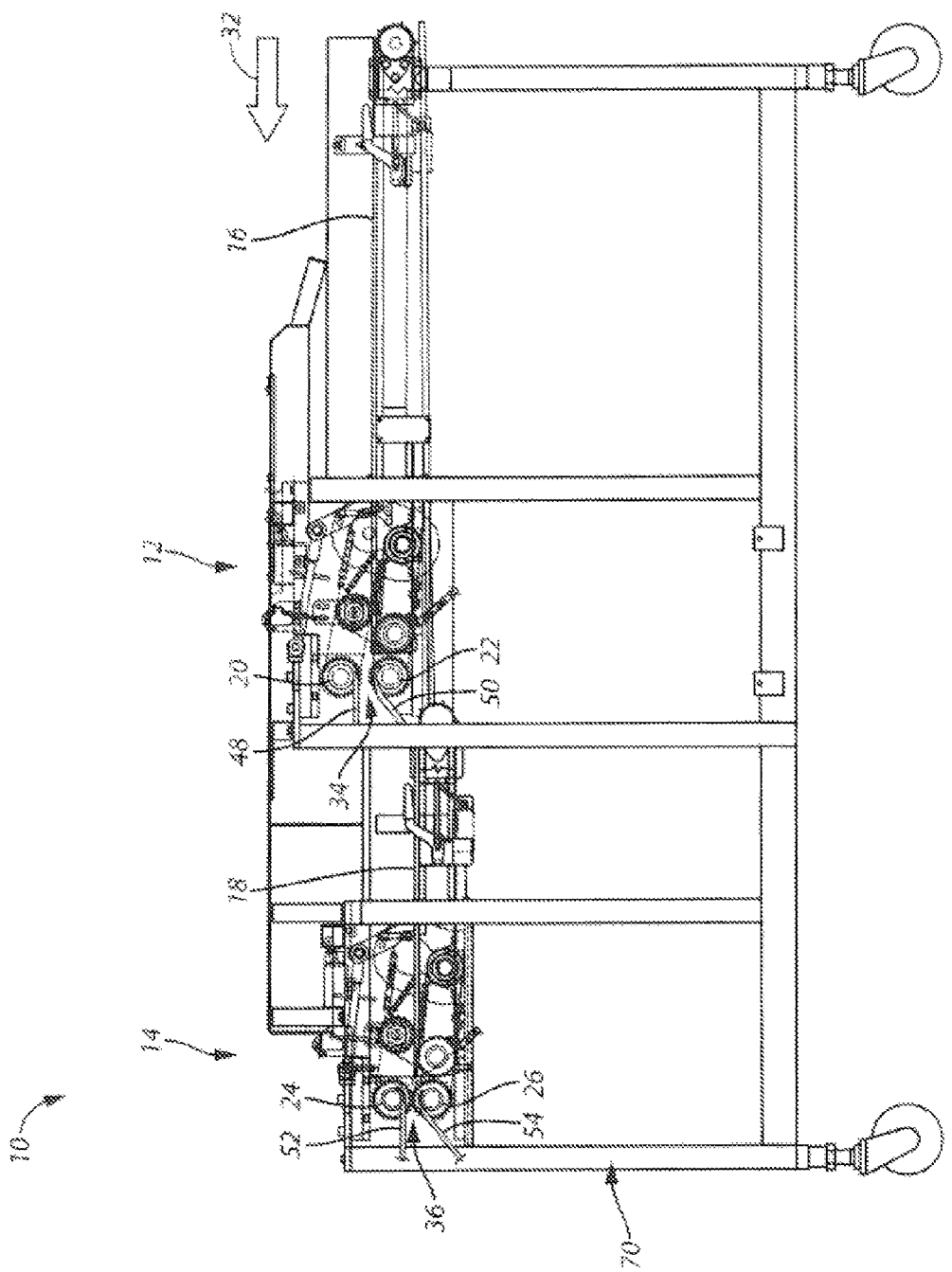
FIG. 2 is a more detailed side view of another embodiment thereof.

Turning now to FIG. 2, the first and second maceration stations 12, 14 and first and second conveyors 16, 18 may be mounted on a single frame 70 as illustrated. However, other embodiments may have independent frames for the maceration stations 12, 14 and may be connected by a conveyor that may be connected to one of the frames for the stations 12, 14 or may be connected to another independent frame. The overall design of the frame or frames, along with the various elements mounted thereon, may depend on the desired uses or the installation space for the apparatus 10.

Figure 3:
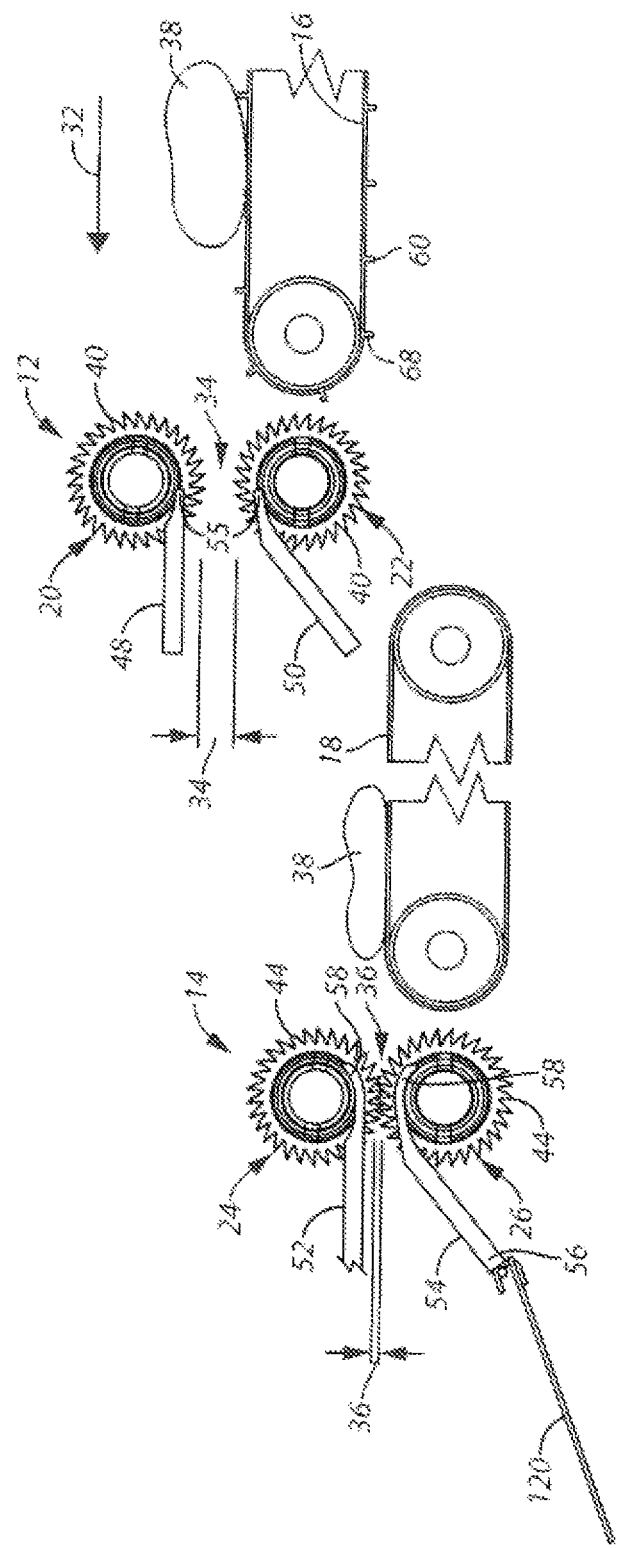
FIG. 3 is a partial schematic cross sectional view of portions of the embodiment of FIG. 1.

FIG. 2 illustrates maceration apparatus 10 having a first maceration station 12 and a second maceration station 14. Arrow 32 illustrates the product flow that the raw meat pieces will adopt once placed on the first conveyor 16. As illustrated, conveyor 16 delivers the whole muscle meat to the upper and lower arbors 20, 22 of the first maceration station 12. A first distance 34 between the upper and lower arbors 20, 22 is illustrated and is larger than a second distance 36 between the upper and lower arbors 24, 26 of the second station 14. Indeed, the second distance 36 may be a negative distance such that the projections of the second maceration station 14 intermesh, as discussed below. FIGS. 2 and 3 also illustrate how the second conveyor 18 is located below the first conveyor 16. The elevation difference between the two maceration stations 12, 14 may help advance the meat pieces from the first maceration station 12 to the second maceration station 14.

In one illustrative embodiment, the first and second maceration stations 12, 14 are adjustable. For example, the first distance 34 between the arbors 20, 22 may be adjusted, which may be helpful for macerating different types of meat. In addition to adjusting the first and second distances 34, 36, the operational parameters of the arbors may be adjusted. For example, the operational speed or the rpm of the arbors in the first and second maceration stations 12, 14 may be adjustable. In one example embodiment, the rate of rotation of the second maceration station 14 may be faster than the first maceration station 12. As discussed below, the second stage arbors 24, 26 may have smaller diameters and, therefore, even if the throughputs in the first and second maceration stations 12, 14 are equal to one another, the second stage arbors 24, 26 will run at a higher rate than the first stage arbors 20, 22.

As shown in FIG. 3, the raw meat pieces 38 advance from upstream of the first maceration station 12 and between the upper and lower arbors 20, 22, as shown by product flow 32. While passing between the upper and lower arbors 20, 22, the arbor projections contact the surface of the raw meat piece 38. Projections 28 and recesses 30 may be generally uniform between the two macerations stations, or alternatively, the projections 28 and recesses 30 (FIG. 5) of the two maceration stations 12, 14 may be tailored for the different functions of the particular maceration station. For example, the projections 44 on the arbors of the second maceration station 14 may be smaller or may have a different geometry or configuration that the first stage projections 40. The projections illustrated in FIG. 3 include upper and lower projections 40 at the first maceration station 12 and upper and lower projections 44 at the second maceration station 14.

As illustrated in FIG. 3, it is anticipated that each arbor 20, 22, 24, 26 may have a comb or stripper blade 48, 50, 52, 54 associated therewith. The stripper blades assist in removing the raw meat pieces from the arbors. By one approach, each stripper blade 48, 50, 52, 54 has a body 56 (shown in FIG. 3) that is mounted at one end on the frame 70 and tines 55 or 58 that extend from the body 56 and into the recesses 30 of the associated arbor and in between the projections 28.

There are primarily two tine configurations 55, 58, both of which are illustrated in FIG. 3. By one approach, the tines 58 can wrap partially around the arbor, thereby filling portions of the spaces that would otherwise receive portions of the meat pieces, as with the second stage arbors 24, 26 of FIG. 3. More particularly, the tines 58 may extend from the exit side of the arbor to the in-feed side of the arbor, where the meat pieces enter the arbor so that the meat pieces are not compressed deeply into the recesses. Thus, the meat is more gently macerated, thereby helping to preserve the whole muscle character of the meat and may be more easily removed from the arbor.

By another approach, the tines 55 can extend only slightly around the arbor in the recesses, as illustrated in the first stage arbors 20, 22 of FIG. 3. The shorter tines of the first stage arbors 20, 22 permit the meat to be more aggressively worked by allowing the full depth of the arbor recess 30 to be used and reached by the meat pieces.

The first and second conveyors 16, 18 are typically endless conveyor belts that wrap around at least two rollers. The conveyors 16, 18 may have smooth surfaces or the conveyors 16, 18 may further include logs, spikes, or projections 60. The projections 60 provide additional traction on the conveyors 16, 18 for the meat pieces and prevent sliding of the meat in relation to the conveyor belt. By one approach, the projections 60 extend across the width of the conveyors 16, 18. The projections 60 may be positioned perpendicular to the product flow and are generally used to prevent sliding. Projections 60 may be employed only on the first conveyor 16 as shown, or on both conveyors. For some meat types a smooth belt will adequately convey the meat such that no projections 60 are necessary. For other types of meat the addition of projections 60 may be necessary to provide additional traction.

The conveyors 16, 18 may be horizontal, or one or both may be slightly sloped to increase the flow of the product to the maceration stations. By one approach, the slope may be 30° or less. In another example, the slope of conveyor 16 may be more than 30°, depending on the application and the type of meat being processed. Such a slope may assist in feeding the meat through the apparatus 10, while also retaining control of the movement of the meat. The first conveyor 16 may have a more significant slope than the second.

A photoelectric sensor (photo eye) or other similar device may be mounted between the first and second maceration stages 12, 14 to monitor the volume of meat passing on the conveyor 18. Such a device may be able to detect and help prevent meat from piling up and assuring even throughput in both stages. Based on the data gathered by the photo eye, the rotation of arbors of the first or second maceration stations may be adjusted e.g., in response to accumulation of meat pieces, or in response to a decrease in accumulation.

Figure 5:
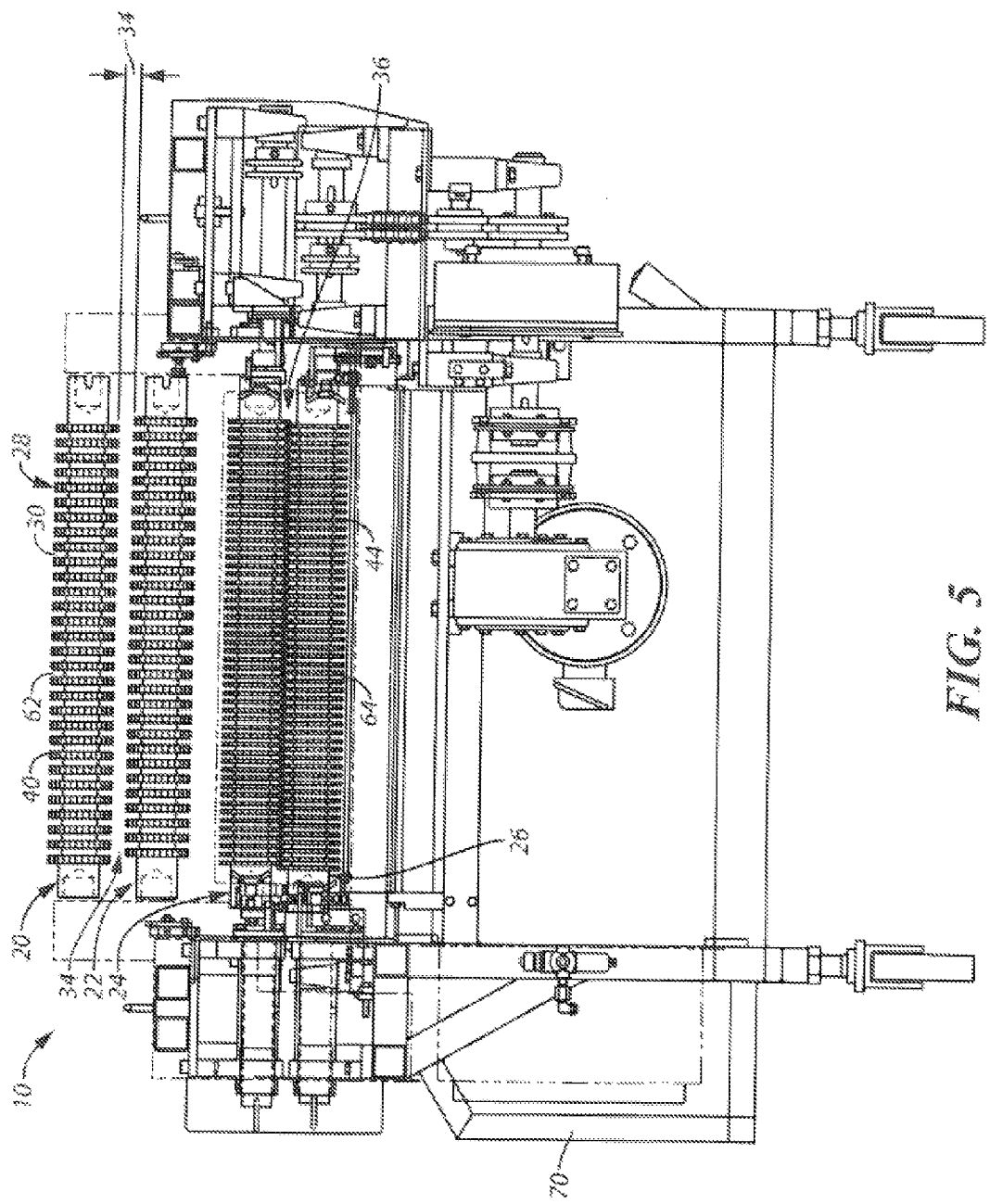
FIG. 5 is an end view of FIG. 2.

As shown in FIG. 5, the arbors of the first maceration station 12 are spaced from one another by a first distance 34 and the arbors of the second maceration station 14 are spaced from one another by a second distance 36. The arbors of the second maceration station 14 may not have such a space between the projections 44 of the two arbors 24, 26. Instead, the projections 44 of the upper arbor 24 may intermesh with the projections 44 of the lower arbor 26 at the second maceration station 14 such that the projections 44 extend into the recesses 64 of the corresponding arbor. Thus, the second distance 36 may be thought of as a negative distance or a lack of space between the arbors.

In other embodiments, both the first stage arbors 20, 22 and the second stage arbors 24, 26 intermesh, and the arbors 24, 26 of the second maceration station 14 intermesh or overlap more than the arbors 20, 22 of the first maceration station 12, such that the projections 44 of the second maceration station 12 extend further into their corresponding recesses 64 than those of the first maceration station 12. In this configuration, both distances 34, 36 may be thought of as a negative distance or an intermeshing of the projections. By yet another approach, both the first and second distances 34, 36 may provide gaps or spaces between the arbors of both stages 12, 14. The second distance 36 may be smaller than the first distance 34 and the projections 40 of the first maceration station 12 may be farther apart than the projections 44 of the second maceration station 14.

The size, geometry, and configuration of the projections on the two sets of arbors may be the same or may be different. Since the functions of the two maceration stations 12, 14 are differently focused, the arbors may be tailored toward those different functions. In the embodiment of FIG. 5, the width of the first stage projections 40 is greater than the width of the second stage projections 44, and the width of the first stage recesses 62 is larger than the width of the second stage recesses 64. Due to the smaller size of the projections 44 and recesses 64, the second stage arbors 24, 26 may have more projections and recesses than the first stage arbors 20, 22. The two arbor sets 12, 14 may also be operated in a different manner.

In one illustrative embodiment, the first stage arbors 20, 22 may have a central working area 66 and the second stage arbors 24, 26 may have a central working area 68. The width of the central working areas 66, 68 is between about 12 to 30 in. The width chosen for the working areas 66, 68 may depend on the desired throughput. Furthermore, the width of the central working areas 66, 68 is about equal to the width of the conveyors 16, 18. A set of guides may be positioned on the sides of the conveyors 16, 18 to keep the meat pieces on the conveyor and within the working width.

A variety of overall arbor configurations may be employed. In one illustrative embodiment, each of the first and second stage arbors 20, 22, 24, 26 has the exact same geometry and sizing such that only one arbor configuration is manufactured for the apparatus. In such an embodiment, the ends of the lower arbor will be reversed relative to the upper arbor when installed into the frame 70. In another embodiment, while the upper and lower arbors within each station 12, 14 are identical, the arbors of the first maceration station 12 are different from those in the second maceration station 14. In yet another embodiment, each of the arbors 20, 22, 24, 26 is specifically designed such that no two arbors are the same. In such a configuration, four separate arbors are manufactured.

FIG. 6 illustrates the upper arbor 20 of the first maceration station 12. The rows of projections 40 of the first stage may have a projection width 82 of about 0.18 to 0.5 in. and the recesses 62 of the first stage may have a recess width 82 of between about 0.2 to 1.0 in. By one approach, the width 82 of each projection 40 and recess 62 is about 0.44 in. with the recesses are slightly larger than the projections. The width of projections 40 generally is slightly less than the width of the recesses 62 to enable the rows of projections 40 to extend into the recesses 62. For example, if the width of recesses 62 is about 0.5 in., the row of projections 40 may be about 0.438 in.

This slight difference helps accommodate intermeshing. In other configurations, the recesses can be significantly wider than the projections.

In one illustrative embodiment, the bottom arbor 22 of the first maceration station 12 is similar to the top arbor 20, except for a few adjustments so that the arbors may cooperate together to counter-rotate and more effectively macerate the meat passing between the arbors. For example, the bottom arbor 22 has a series of recesses 62 that are aligned opposite the projections 40 of the top arbor 20 such that the arbors can intermesh together and the projections 40 of the bottom arbor 22 are aligned opposite the recesses 62 of the top arbor 20. Other minor differences between the upper and lower arbors may include the orientation (or angling direction) of the projections 40 and the attachment of the stripper blades 48, 50.

The width of central working areas 66, 68 corresponds to the first and second conveyors 16, 18, which also may have a width of about 12 to 30 in. By one approach, the width of the central working areas and the width of the conveyors are about 26 in. By another approach, the width of the central working area and the width of the conveyors are about 16 in. The arbors 20, 22, 24, 26 may have end portions 72, 74 on either end of the central working areas 66, 68. By one approach, the entire length of the arbors 20, 22, 24, 26 including the central working areas 66, 68 and the end portions 72, 74 may be about 30 to 35 in. In one illustrative approach, the entire length of the arbors is about 31.2 in. By another approach, the entire length of the arbors 20, 22, 24, 26 may be about 21 to 26 in. The overall length of the arbors depends on the width of the central working areas and it is anticipated that the overall length of the arbors may be about five inches larger than the width of the working areas.

The outer diameter 80 of first stage arbors 20, 22 may be between about 2.5 and 7.0 in. By one approach, the outer diameter 80 may be about 3.8 in. By yet another approach, the outer diameter 80 may be about 5.5 in. The diameter of the arbor 20 at the recesses 40 may vary depending on the type of meat to be processed, the type of processing desired, and the other parameters and configuration of the arbors. In one illustrative embodiment, the radial dimension of the recess is about 0.75 in. and extends around the shaft such that the outer diameter is about 5.5 in. and the inner diameter at the recess is about 4.0 in.

Referring to FIG. 6, the end portions 72 of the first stage arbor 20 have central cavities 76, 78. The central cavity 76 is configured to engage a drive shaft that rotates the arbor 20. Furthermore, the end portion 72 with central cavity 78 is configured to act as a spindle, which rotatably mounts onto an idler gear or a portion of the apparatus frame. By one approach, the end portions 72 may have an outer diameter 84 of between about 1.75 to 2.75 in. In one illustrative embodiment, the outer diameter 84 of the end portions 72 is about 2.4 in. By one approach, the inner diameter 92 may be between about 1.5 and 6.25 in. In one illustrative embodiment, the inner diameter 92 may be about 2.0 in.

FIG. 7 illustrates a portion of one row 28 of projections 40. Each row 28 includes a plurality of individual teeth 88 and a space 86 between each pair of adjacent teeth. By one illustrative approach, each tooth 88 has a sharp edge 90 that is pressed into the meat passing between the arbors 20, 22. One side of each tooth may comprise a first surface 94 extending inward and rearward behind edge 90 to angle or bend 96. The teeth 88 are configured to allow the meat pieces to be easily removed from the teeth by the stripper blades 48, 50 (illustrated in FIG. 3) without doing unnecessary damage or tearing of the meat pieces. In addition to the angled portion, it is anticipated that the individual teeth 88 may include a wave or curved portion configured to permit easy removal of the meat from the projections 40.

The second stage arbors 24, 26 may have central working areas 68 that correspond to the working areas of the first stage arbors 20, 22 and the conveyors 16, 18. The upper arbor 24, shown in FIG. 8, includes rows of projections 44 and recesses 64. As mentioned above, the projections 44 and recesses 64 may be smaller than the projections 40 and recesses 62 of the first maceration station 12. The rows of projections 44 and recesses 64 may have a width 98 of about 0.18 to 0.5 in. By one approach, the width of the rows of projections 44 and recesses 64 may be about 0.28 in. Further, the width of the rows of projections 44 may be slightly smaller than the width of the rows of recesses 64 such that the rows of projections 44 can extend into the recesses 64. For example, the recesses 64 may be about 0.28 in. and the projections 44 may be about 0.22 in. A slight difference in the widths helps accommodate the intermeshing of the elements. For example, by one approach, the projections are about 0.18 to 0.37 in. and the recesses may be about 0.2 to 0.5 in.

The bottom arbor 26 of the second maceration station 14 is similar to the top arbor 24, except for a few adjustments so that the arbors may cooperate together to counter-rotate and macerate the meat passing between the arbors. For example, the bottom arbor 26 has a series of recesses 64 that are aligned opposite the projections 44 of the top arbor 24 such that the arbors can intermesh together. Other minor differences between the upper and lower arbors may include the orientation (or angling direction) of the projections 44 and the attachment of the stripper blades 52, 54, to note but a few differences between the upper and lower arbors 24, 26 of the first maceration station 14. As suggested above, in one embodiment, the upper and lower arbors of the second set 24, 26 are the same when manufactured and then, when installed, the ends of one of the arbors are reversed relative to the other arbor, which permits intermeshing of the two arbors.

Figure 8:
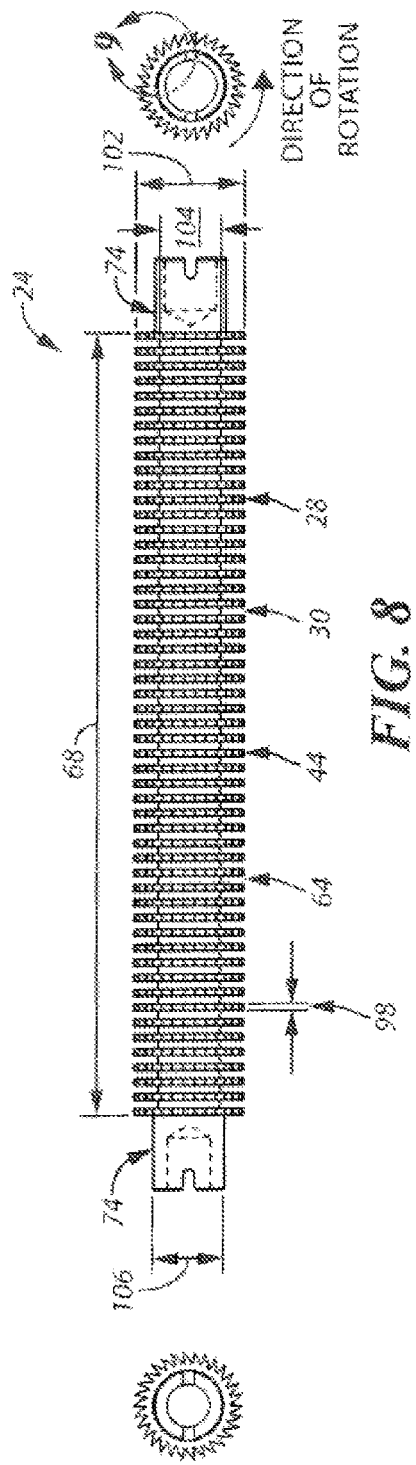
FIG. 8 is a detail top view of one of the second stage arbors of FIG. 2.

As shown in FIG. 8, the outer diameter 102 of the upper arbor 24 extends from the projections 44 on one side of the arbor to the projections 44 on the other side of the arbor. By one illustrative approach, the outer diameter 102 of arbors 24, 26 may be between about 2.5 and 4.5 in. By one approach, the outer diameter 102 may be about 3.6 in. An inner diameter 104 of the arbor 24 is the diameter of the arbor 24 at one of the recesses 44. FIG. 8 illustrates the end portions 74, which, like those shown in FIG. 6, have central cavities 76, 78 adapted to engage a drive shaft and to mount the arbors.

Figure 9:
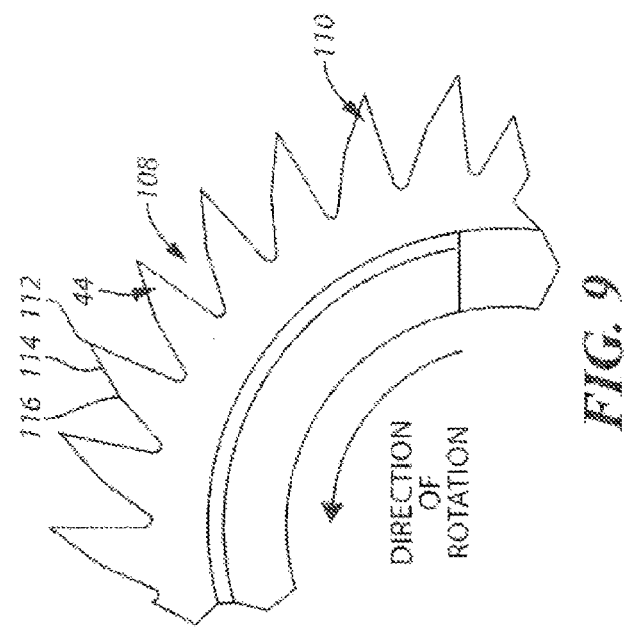
FIG. 9 is a side view of a portion of FIG. 8.

FIG. 9 illustrates a detailed sectional view of a portion of one row 28 of projections 44. Each row 28 includes a plurality of individual teeth 110 and a space 108 between each tooth. By one approach, each tooth 110 has a sharp edge 112 that is angled to be pressed into the meat passing between the arbors. One side of each tooth may include a surface 114 that begins at a slight angle or bend 116 in the face of the individual tooth 110. The angling of a portion of the projections 44 assists the stripper blades 52, 54 with removing the meat from the teeth 110 such that the meat pieces are not unnecessarily damaged.

While projections 40 and 44 are illustrated as individual teeth having sharp edges, it is also anticipated that the projections may have a variety of configurations, sizes, and geometries. For example, in addition to a tooth shaped projection, a square or rectangular shaped projection, a frusto-conical shaped projection, a projection with a curve or waved profile, and/or a cone shaped (spiked) projection may be employed.

Figure 11:
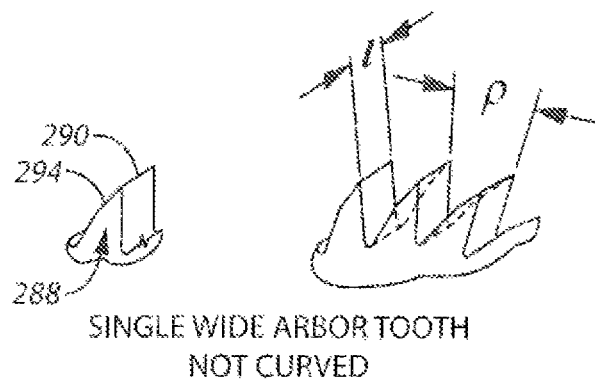
FIGS. 11 to 14 are partial perspective views of portions of arbors.
Figure 12:
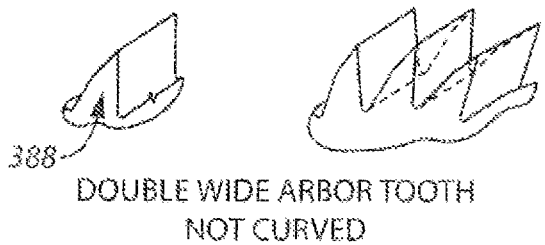

FIGS. 11 to 14 illustrate four configurations of the individual teeth. FIG. 11 shows a single individual tooth 288 and a plurality of individual teeth 288. One side of the tooth 288 may comprise a first surface 294 that includes an angle or bend 296. The axial dimension or width 'l' of the individual teeth 288 may be about 0.1 to 0.3 in., i.e., about 0.2 in. and the length of the sharp edge 290 also is equal to the width 'l'. FIG. 12 illustrates individual teeth 388, which are similar to individual teeth 288. Each of those individual teeth 388 has a width that is approximately double that of the individual teeth 388, i.e., about 0.4 in. The double width individual teeth 388 may be used on a larger system that has wider arbors and provides additional throughput. In other configurations, the double width individual teeth 388 may be employed on the first stage arbors 20, 22 of the first maceration station 12, whereas the single width individual teeth 288 may be employed on the second stage arbors 24, 26.

Figure 13:
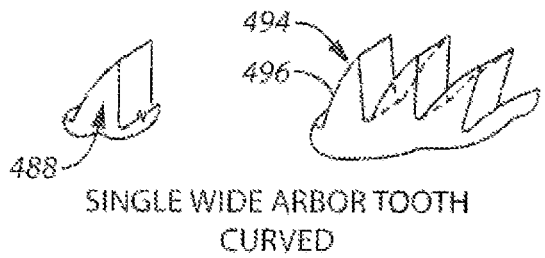
Figure 14:
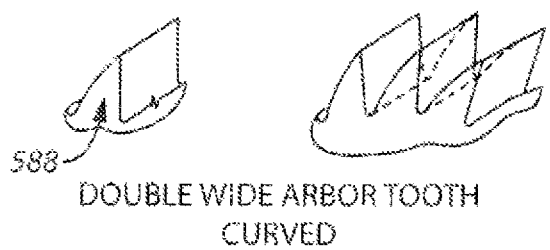

In another configuration shown in FIG. 13, each of the individual teeth 488 may have a curved portion 496 on a first surface 494 such that a portion of the individual tooth has a curved profile. The curved portion 496, similar to angled portion 296, permits the meat to be more easily removed from the arbors with the stripper blades. FIG. 14 illustrates individual teeth 588 having a curved portion 596 in a double width configuration.

FIG. 11 illustrates $\rho$ as the distance from the face of one tooth to a corresponding face of another tooth. Though distance $\rho$ is approximately equal in FIGS. 11 through 14, apparatus 10 may be configured with different distances $\rho$ between the teeth on the first stage arbor and the teeth on the second stage arbor. For example, if the diameter of a first stage arbor is larger than the second stage arbor and the number of teeth disposed on the two arbor sets is the same, then the distance $\rho$ is larger on the first stage arbors than the second stage arbors. On the other hand, if the diameter of the two arbor sets is different and the distance $\rho$ of the two arbors sets is equivalent, then the number of teeth disposed upon one of the arbor sets is greater relative to the other arbor set.

Figure 10:
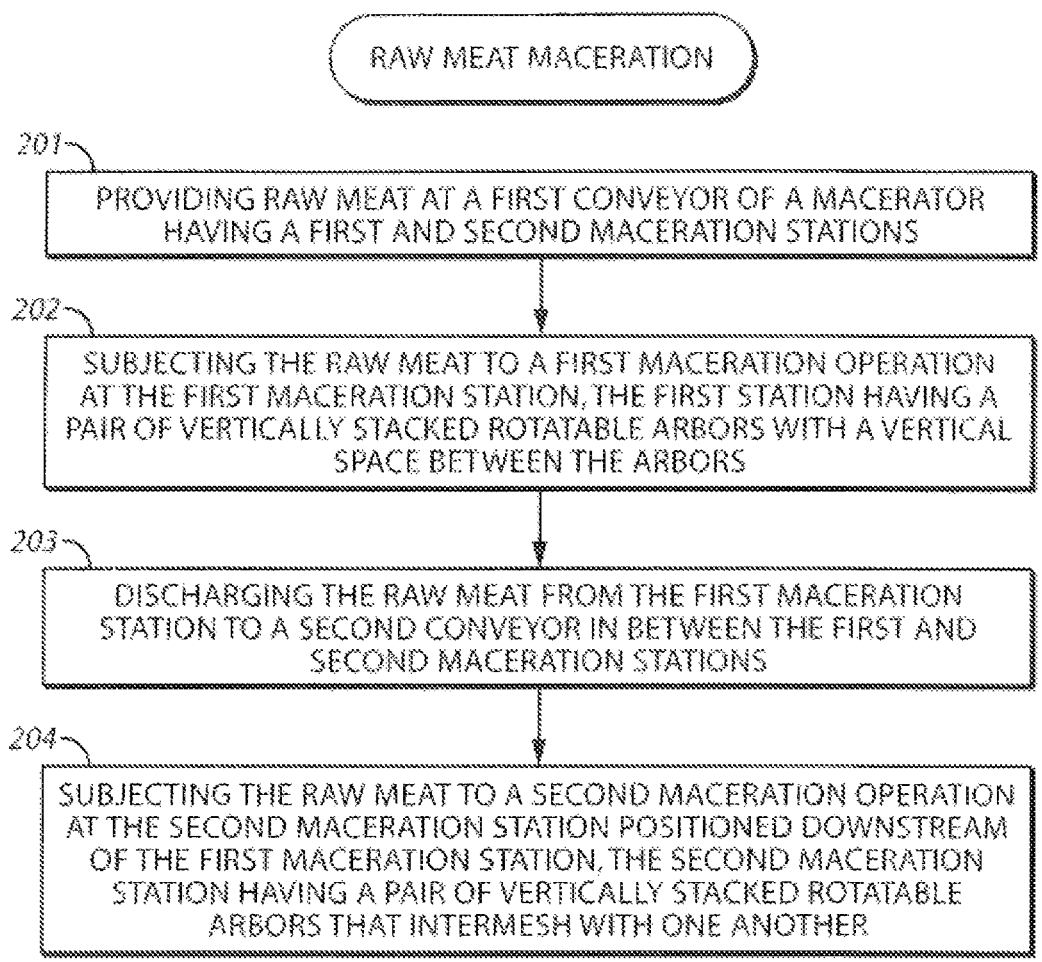
FIG. 10 is a flow diagram.

FIG. 10 presents one process 200 for using the above-described apparatus. The raw meat may be any of a variety of meats including chicken, beef, pork, and turkey, among others. Further, the configuration of the arbors including, for example, the projections 28, recesses 30, and distances 34, 36 between the arbors, may be adjusted depending on the type of raw meat being processed and the desired final meat product. For some meat products, the geometry and projections of the arbors can be different between the first and second maceration stations. In addition, the projections in the first maceration station may be bigger and spaced father apart on the circumference, in the arbor axis direction, than the projections in the second maceration station. Further, as discussed above, the distance or gap between the projections on the arbors of the first stage may be larger than the distance between the projections of the second stage. The distance between the arbors of the second stage may not only be smaller, but also may be a negative distance such that the projections intermesh with one another. As used herein, raw whole meat pieces may include raw whole muscle meat and raw whole muscle portions that are still largely intact but may be less intact than a complete whole muscle.

As mentioned, whole muscle meat macerated with the illustrative maceration apparatus 10 undergoes an increase in surface area without excessive tearing and has an improved water holding capacity. By crushing the cells of the whole muscle meat as described herein, individual cell membranes are ruptured, however, the overall structure of the whole muscle meat is retained, thereby maintaining its overall appearance. By rupturing the cell walls, ingredients including, for example, salt, spice, water, cure accelerator, nitrite, and other preservatives, are more quickly absorbed into the whole muscle meat. Rupturing the cell membranes may occur by causing the cell walls to burst or become weak, porous, and/or leaky.

In addition to providing for rapid absorption, it is desirable that the maceration provide for relatively uniform absorption of the ingredients. Uniform absorption of the ingredients helps ensure proper color development. For example, if portions of a ham muscle have not undergone sufficient absorption of ingredients, they may be somewhat gray in color once cooked, as opposed to the desired pink color. Proper color development can indicate that the meat has been properly cured.

It is also desirable that the maceration and subsequent curing provide for protein extraction, which occurs when the salt solution reaches salt-extractable proteins. The curing process can be performed in a variety of ways. For example, the whole muscle meat may be collected in containers and stored in a cooler while the ingredients diffuse through the whole muscle meat, which can take a day or more. This is called a cover pickle or a cover brine. Indeed, the pickle cure time may range from 48 hours to 7 days, depending on whether the meat also has undergone pickle injection. If the whole muscle meat is not injected with the brine solution, the pickle cure time typically may range from 5 to 14 days.

To accelerate the curing process, the whole muscle meat may be sent through a pickle injector that employs hypodermic-type needles to puncture the meat and to inject pickle solution through the needles and into the meat, as it travels through the pickle injector on a conveyor. This injection step helps diffuse the cure or pickle solution through the meat and also serves to tenderize the meat. Also, reducing the size of the whole muscle meat pieces can accelerate the cure process.

To shorten the cure time, the whole muscle meats are typically injected with the curing mixture including water and other ingredients to accelerate the diffusion of the ingredients, however, macerating the whole muscle meat, as described herein, may also accelerate the diffusion of the ingredients and the cure process without requiring the pickle injector or a significant reduction in the size of the whole muscle meat pieces.

The apparatus 10 accelerates the cure process such that uniform color development may occur within 24-48 hours, whereas certain prior art processes may require, e.g., about 72 hours or more. The apparatus 10 provides for rupturing a significant percentage of cells. For example, between 10-90% of the cell membranes may be ruptured in the whole muscle meat processed by apparatus 10. By one approach, about 45-75% of the cells are ruptured. By another approach, 50-60% of the cells are ruptured. These percentages may be different depending on the type or section of whole muscle meat. These percentages are averages over the entire piece of whole muscle meat being macerated.

A stable protein matrix employs protein bonds to suspend fat and water. In this process, salt soluble or salt-extractable and heat coagulable proteins such as myosin, actomyosin, and actin bind water, swell, and become tacky as a result of working or blending of the meat in the presence of a salt or a salt solution. The proteins are subsequently set when heated to create a bond. Other myofibrillar proteins, as well as sacroplasmic or water soluble or extractable proteins, may also play a role in bonding.

Whole muscle meat products such as ham with natural juices and ham with water added often comprise about 18% and 17% protein, respectively. A typical raw ham whole muscle meat has about 20% protein, whereas the protein in the final product is about 17-18% after maceration and incorporation into a finished consumer product. Thus, a significant amount of water is absorbed into the whole muscle meat pieces. Indeed, whole muscle meat may have about 70-77% water once formed into a consumer food product. Processed consumer products typically have non-meat ingredients (including added water and flavorings) that dilute the meat protein, however, the percentage of water in the raw and processed consumer product remains generally similar because the addition of the water is accompanied by the addition of other, ingredients. As another example, a raw turkey breast has a protein amount of about 20.7%, whereas the amount of protein in the final turkey breast is about 16 to 17%, i.e., 16.6%, after maceration and incorporation into a finished consumer product. As another example, lean beef muscle denuded may have a protein amount of about 21.5% and an amount of protein after maceration of about 17% in the final product. In sum, maceration may improve the water holding capacity for these raw whole muscle meats as they are processed into a final consumer product.

The apparatus 10 and the process 200 can be employed to provide different degrees of maceration. In some embodiments, the degree of maceration may be described by the inequality:

$$\tau/P_1 > 5{,}000\, P_2/P_3,$$

where $\tau$ is the cure time (in hours) required to achieve uniform color development after maceration using a curing process; $P_1$ is the decrease in protein as a percentage of total weight due to absorption of water and other ingredients during the curing process, over period $\tau$; $P_2$ is the percentage of muscle cells ruptured during maceration; and $P_3$ is the weight percentage of protein in the whole muscle meat pieces prior to maceration. In addition, the units for value 5,000 may be considered to be hours. As further outlined below, the following parameters may apply: $0 < \tau < 72$; $1\% < P_1 < 5\%$; $10\% < P_2 < 90\%$; and $15\% < P_3 < 25\%$.

Maceration decreases the amount of time needed to cure the raw whole muscle meat pieces. Indeed, the apparatus 10 typically reduces cure time by a factor of about 2 to 5, depending on the meat species. In some embodiments, the cure time to achieve uniform color development after maceration $\tau_e$ may be described by the inequality, where $\tau_a$ is the cure time to achieve uniform color without maceration:

$$\tau_e < \tau_a/\mu \text{ and } \mu = 2 \text{ to } 5.$$

Maceration affects the absorption of water and other ingredients and the degree of maceration may be represented, in part, by the change in protein after maceration and the percentage of muscle cells ruptured during maceration. The percentage decrease in protein after maceration, $P_1$, may by represented as:

$$P_1 = (P_a - P_e)/P_a,$$

where $P_a$ is the percentage of protein prior to maceration where no additional water is added; $P_e$ is the percentage of proteins subsequent to maceration and addition of the cure mixture.

The percentage of muscle cells ruptured during maceration, which may be represented by $P_2$, may be represented as follows:

$$P_2 = X_e/X_2,$$

where $X_e$ is the number of cells ruptured during maceration and $X_2$ is the total number of muscle cells.

$P_3$ is the weight percentage of protein in whole muscle meat prior to maceration and may be represented as:

$$P_3 = P_d/P_x$$

As noted above, $P_a$ is the weight percentage of protein prior to maceration where no additional water is added and $P_x$ is the total weight of the whole muscle meat.

A wide variety of modifications, alterations, and combinations can be made with respect to the above described embodiments without departing from the scope of the invention, and such modifications, alterations, and combinations are to be viewed as being within the ambit of the inventive concept.

We claim:

1. An apparatus for macerating raw meat pieces, the apparatus comprising:
   a first arbor set having upper and lower rotatable arbors defining a first distance between the upper and lower rotatable arbors, the first arbor set being configured to receive a large variety of sizes and configurations of raw meat pieces, to advance the raw meat pieces therethrough, and to reduce the thickness of at least some of the raw meat pieces advancing therethrough thereby reducing variations in thickness among the meat pieces;
   a second arbor set having upper and lower rotatable arbors defining a second distance between the upper and lower rotatable arbors, the second distance being smaller than the first distance, the second arbor set being configured to receive the raw meat pieces, to advance the raw meat pieces therethrough, and to increase the surface area of at least some of the raw meat pieces advancing therethrough;
   a first conveyor configured to receive whole muscle meat and deliver the raw meat pieces to the first arbor set; and
   a second conveyor configured to receive the raw meat pieces discharged from the first arbor set and deliver the raw meat pieces discharged from the first arbor set to the second arbor set;
   wherein the first and second arbor sets are spaced from each other by a sufficient distance to prevent the raw meat pieces from being engaged by both arbor sets at the same time, thereby avoiding excessive tearing of the raw meat pieces;
   the upper and lower arbors of the first arbor set have first set projections and recesses disposed in an offset arrangement such that first set projections of the upper arbor are positioned opposite the first set recesses of the lower arbor; and
   the upper and lower arbors of the second arbor set have second set projections and recesses disposed in an offset arrangement such that the second set projections of the upper arbor are positioned opposite the second set recesses of the lower arbor.

2. The apparatus of claim 1 wherein the projections may have at least one of:
   a tooth shape;
   a rectangular shape;
   a frustoconical shape;
   a curved profile; and
   a cone shape.

3. The apparatus of claim 1 wherein the first and second set projections are radially projecting teeth members with an edge extending between a first projection side surface and a second projection side surface.

4. The apparatus of claim 1 wherein the first arbor set further comprises a first pattern of projections and recesses disposed in alternating rows on the upper and lower arbors and the second arbor set further comprises a second pattern of projections and recesses disposed in alternating rows on the upper and lower arbors.

5. The apparatus of claim 4 wherein the projections and recesses of the first arbor set are wider than the projections and recesses of the second arbor set.

6. The apparatus of claim 4 wherein the projections and recesses of the first arbor set have a first width equal to a second width of the projections and recesses of the second arbor set.

7. The apparatus of claim 1 wherein the first arbor set has a first diameter and the second arbor set has a second diameter, the first diameter of the first arbor set being larger than the second diameter of the second arbor set.

8. The apparatus of claim 1 wherein one of the first or second conveyors has projections extending perpendicular to a direction of flow of the raw meat pieces.

9. The apparatus of claim 1 wherein the first arbor set and second arbor set are adjustable.

10. The apparatus of claim 9 wherein at least one of the following is adjustable:
   rotation per minute (rpm) of the first arbor set;
   rotation per minute (rpm) of the second arbor set;
   the first distance between the upper and lower rotatable arbors of the first arbor set;
   the second distance between the upper and lower rotatable arbors of the second arbor set; and
   sizes and configurations of projections and recesses disposed on the first and second arbor sets.

11. The apparatus of claim 1 wherein the first and second arbor sets may have at least one of:
   an integral construction; and
   an individually assembled construction of individual discs of projections and recesses.

12. The apparatus of claim 1 further comprising a photoelectric sensor between the first and second arbor sets.

13. The apparatus of claim 1 further comprising a stripper blade associated with at least one of the arbors of the first and second arbor sets.

14. The apparatus of claim 1 wherein the raw whole muscle meat includes muscle cells and wherein the first and second arbors are configured to rupture 10-90% of the muscle cells.

15. The apparatus of claim 1 wherein the raw whole muscle meat includes muscle cells and wherein the first and second arbors are configured to rupture 50-70% of the muscle cells and wherein the raw meat pieces are further processed into a ham product having about 17% protein.

16. The apparatus of claim 1 wherein the raw whole muscle meat includes muscle cells and wherein the first and second arbors are configured to rupture 30-50% of the muscle and the raw meat pieces are further processed into a ham product having about 18% protein.

17. The apparatus of claim 1 wherein the raw whole muscle meat includes muscle cells and wherein the first and second arbors are configured to rupture 50-70% of the muscle cells and the raw meat pieces are further processed into a turkey breast product having about 17% protein.

18. The apparatus of claim 1 wherein the raw whole muscle meat includes muscle cells and wherein the first and second arbors are configured to rupture about 30-50% of the muscle cells and the raw meat pieces are further processed into a lean beef product having about 19% protein.

19. The apparatus of claim 1 wherein the upper and lower arbors of the second arbor set are configurable into an intermeshing arrangement such that the second set projections of the upper arbor extend into the second set recesses of the lower arbor and the second set projections of the lower arbor extend into the second set recesses of the upper arbor.

20. The apparatus of claim 1 wherein the first set projections have a projection width of between about 0.18-in. to about 0.5-in. and the first set recesses have a recess width of about 0.2-in. to about 1.0-in.

21. The apparatus of claim 1 wherein the second set projections have a projection width of between about 0.18-in. to about 0.37-in. and the second set recesses have a recess width of about 0.2-in. to about 0.5-in.

22. An apparatus for working raw meat pieces, the apparatus comprising:
   a first maceration station having a first pair of counter-rotating shafts, the shafts configured in a first vertically stacked arrangement and having a first vertical distance between the shafts, the first maceration station configured to receive raw meat pieces having a variety of sizes and configurations;
   a second maceration station having a second pair of counter-rotating shafts, the shafts configured in a second vertically stacked arrangement and having a second vertical distance between the shafts;
   an endless conveyor belt positioned downstream of the first maceration station and upstream of the second maceration station, the endless conveyor belt configured to deliver whole muscle meat from the first maceration station to the second maceration station;
   the first pair of counter-rotating shafts having an array of first set projections and recesses disposed in an offset arrangement with the first set projections on one of the first pair of counter-rotating shafts being positioned opposite the first set recesses on the other of the first pair of counter-rotating shafts; and
   the second pair of counter-rotating shafts having an array of second set projections and recesses disposed in an offset arrangement with the second set projections on one of the second pair of counter-rotating shafts being positioned opposite the second set recesses on the other of the second pair of counter-rotating shafts.

23. The apparatus of claim 22 wherein the endless conveyor belt provides a sufficient distance between the first and second maceration stations such that the raw meat pieces are processed by only one of the first or second maceration stations at a given time.

24. A method for treating raw meat, the method comprising:
   providing raw meat pieces at a first conveyor of a macerator having a first and second maceration stations, the raw meat pieces having a variety of sizes and configurations;
   subjecting the raw meat to a first maceration operation at the first maceration station having a first pair rotatable arbors each having projections thereon, the first pair of rotatable arbors having a vertical space in between the rotatable arbors and the projections and being configured to reduce the thickness of at least some of the raw meat pieces;
   discharging the raw meat pieces from the first maceration station to a second conveyor in between the first and second maceration stations; and
   subjecting the raw meat pieces to a second maceration operation at the second maceration station positioned downstream of the first maceration station, the second maceration station having a second pair of rotatable arbors with projections that intermesh with one another, the second pair of rotatable arbors being configured to increase the surface area of at least some of the raw meat pieces.

25. The method of claim 24 wherein the projections of the first and second pairs of rotatable arbors are configured to penetrate into the raw meat.

26. The method of claim 24 wherein the first maceration station is primarily configured to flatten and roughly tenderize the raw meat pieces.

27. The method of claim 24 wherein the second maceration station is primarily configured to increase the surface area and tenderness of the raw meat pieces without breaking apart the raw meat pieces.

28. The method of claim 24 further comprising positioning the second conveyor at a vertical distance below the first maceration station.

29. The method of claim 28 wherein $0<\tau<72$; $1\%<P_1<5\%$; $10\%<P_2<90\%$; and $15\%<P_3<25\%$.

30. The method of claim 24 wherein the degree of maceration may be described by the inequalities:

$$\tau/P_1 < 5{,}000\, P_2/P_3$$

wherein $\tau$ is a cure time in hours required to achieve uniform color development using a curing process after maceration, $P_1$ is a decrease in protein as a percentage of total weight due to absorption of water and other ingredients during curing over period $\tau$, $P_2$ is a percentage of muscle cells ruptured during maceration, and $P_3$ is a weight percentage of protein in whole muscle meat prior to maceration.

31. The apparatus of claim 1 wherein the upper and lower arbors of the first arbor set are configurable into an intermeshing arrangement such that the first set projections of the upper arbor extend into the first set recesses of the lower arbor and the first set projections of the lower arbor extend into the first set recesses of the upper arbor.

\* \* \* \* \*